(12) United States Patent
Qu et al.

(10) Patent No.: US 8,841,914 B2
(45) Date of Patent: *Sep. 23, 2014

(54) ELECTROLOCATION APPARATUS AND METHODS FOR PROVIDING INFORMATION ABOUT ONE OR MORE SUBTERRANEAN FEATURE

(75) Inventors: Qi Qu, Spring, TX (US); Russell L. Maharidge, Spring, TX (US); Thomas J. Pisklak, Cypress, TX (US)

(73) Assignee: Baker Hughes Incorporated, Houston, TX (US)

( * ) Notice: Subject to any disclaimer, the term of this patent is extended or adjusted under 35 U.S.C. 154(b) by 107 days.

This patent is subject to a terminal disclaimer.

(21) Appl. No.: 13/563,944

(22) Filed: Aug. 1, 2012

(65) Prior Publication Data

US 2013/0193975 A1 Aug. 1, 2013

Related U.S. Application Data

(63) Continuation-in-part of application No. 12/421,061, filed on Apr. 9, 2009, now Pat. No. 8,253,417.

(60) Provisional application No. 61/044,153, filed on Apr. 11, 2008.

(51) Int. Cl.
*G01V 3/00* (2006.01)
*G01V 3/26* (2006.01)
*G01V 3/22* (2006.01)

(52) U.S. Cl.
CPC ... *G01V 3/26* (2013.01); *G01V 3/22* (2013.01)
USPC ............ 324/353; 324/366; 324/369; 324/373

(58) Field of Classification Search
USPC .............................. 367/1–86; 166/244.1–403; 73/152.01–152.62; 324/323–375; 343/703, 709, 718–719; 175/1, 40–50
See application file for complete search history.

(56) References Cited

U.S. PATENT DOCUMENTS 1,819,923 A 8/1931 Schlumberger
1,913,293 A 6/1933 Schlumberger
(Continued)

FOREIGN PATENT DOCUMENTS

WO 84/02838 A1 8/1984
WO 00/29716 A2 5/2000
(Continued)

OTHER PUBLICATIONS

Mark Halper, Global Business: Norway's Power Push. Is osmosis the answer to the world's energy shortage? Why the "salient gradient" holds promise, TIME, Dec. 13, 2010, pp. Global 1-2, vol. 176.

(Continued)

*Primary Examiner* — Arleen M Vazquez
*Assistant Examiner* — Alesa Allgood
(74) *Attorney, Agent, or Firm* — E. Randall Smith; Jones & Smith, LLP

(57) ABSTRACT

In some embodiments, a method of approximating or determining at least one dimension of at least one underground geological feature in a zone of interest proximate to a well bore includes generating an electric field in the zone of interest while the well bore and geological feature at least partially contain conductive fluid. At least two sensing electrodes are provided in the well bore and configured to detect differences therebetween in electric potential caused by at least one target object in the zone of interest and provide data relating thereto to at least one data processing system. The data processing system(s) approximates or determines the dimension(s) of the geological feature(s) based at least partially upon data provided by the sensing electrodes.

29 Claims, 9 Drawing Sheets

(56) References Cited

U.S. PATENT DOCUMENTS

| | | | |
|---|---|---|---|
| 3,012,893 A | 12/1961 | Kremzner et al. | |
| 3,818,990 A | 6/1974 | Coulter | |
| 3,985,909 A | 10/1976 | Kirkpatrick | |
| 4,289,794 A | 9/1981 | Kleiner et al. | |
| 5,603,971 A | 2/1997 | Porzio et al. | |
| 5,756,136 A | 5/1998 | Black et al. | |
| 5,918,262 A | 6/1999 | Sanford | |
| 5,929,437 A | 7/1999 | Elliott et al. | |
| 6,023,168 A | 2/2000 | Minerbo | |
| 6,187,351 B1 | 2/2001 | Porzio et al. | |
| 6,330,914 B1 | 12/2001 | Hocking et al. | |
| 6,371,917 B1 | 4/2002 | Ferrara et al. | |
| 6,562,256 B1 | 5/2003 | Fleming et al. | |
| 6,652,895 B2 | 11/2003 | Porzio et al. | |
| 6,684,159 B2 * | 1/2004 | Khan et al. | 702/16 |
| 6,840,318 B2 | 1/2005 | Lee et al. | |
| 7,134,492 B2 | 11/2006 | Willberg et al. | |
| 7,400,262 B2 | 7/2008 | Chemali et al. | |
| 7,424,911 B2 | 9/2008 | McCarthy et al. | |
| 7,803,740 B2 | 9/2010 | Bicerano et al. | |
| 7,803,741 B2 | 9/2010 | Bicerano et al. | |
| 7,803,742 B2 | 9/2010 | Bicerano et al. | |
| 7,819,181 B2 | 10/2010 | Entov et al. | |
| 7,902,125 B2 | 3/2011 | Bicerano et al. | |
| 8,006,754 B2 | 8/2011 | Bicerano | |
| 8,006,755 B2 | 8/2011 | Bicerano | |
| 8,088,718 B2 | 1/2012 | Bicerano et al. | |
| 8,253,417 B2 * | 8/2012 | Pislak et al. | 324/353 |
| 8,258,083 B2 | 9/2012 | Bicerano | |
| 8,278,373 B2 | 10/2012 | Bicerano et al. | |
| 2003/0205376 A1 | 11/2003 | Ayoub et al. | |
| 2004/0040707 A1 | 3/2004 | Dusterhoft et al. | |
| 2004/0176911 A1 | 9/2004 | Bratton et al. | |
| 2005/0272611 A1 | 12/2005 | Lord et al. | |
| 2006/0113077 A1 | 6/2006 | Willberg et al. | |
| 2007/0106006 A1 | 5/2007 | Cooper et al. | |
| 2007/0114028 A1 | 5/2007 | Crabtree et al. | |
| 2007/0161515 A1 | 7/2007 | Bicerano | |
| 2007/0202318 A1 | 8/2007 | Smith et al. | |
| 2008/0125335 A1 | 5/2008 | Bhavsar | |
| 2008/0208054 A1 | 8/2008 | Azuma et al. | |
| 2008/0236814 A1 | 10/2008 | Roddy | |
| 2008/0314586 A1 * | 12/2008 | Freeman | 166/254.2 |
| 2009/0022011 A1 | 1/2009 | Mickael et al. | |
| 2009/0157322 A1 | 6/2009 | Levin | |
| 2009/0179649 A1 | 7/2009 | Schmidt et al. | |
| 2009/0211754 A1 | 8/2009 | Verret et al. | |
| 2009/0250216 A1 | 10/2009 | Bicerano | |
| 2009/0256575 A1 | 10/2009 | Pisklak et al. | |
| 2009/0288820 A1 | 11/2009 | Barron et al. | |
| 2010/0038083 A1 | 2/2010 | Bicerano | |
| 2010/0155065 A1 | 6/2010 | Misselbrook | |
| 2010/0158816 A1 | 6/2010 | Kawabata et al. | |
| 2011/0098202 A1 | 4/2011 | James et al. | |
| 2012/0031613 A1 | 2/2012 | Green | |

FOREIGN PATENT DOCUMENTS

| | | |
|---|---|---|
| WO | 2009/032996 A2 | 3/2009 |
| WO | 2009/047781 | 4/2009 |
| WO | 2009/047781 A2 | 4/2009 |
| WO | 2010/068128 A1 | 6/2010 |
| WO | 2010105177 A2 | 9/2010 |
| WO | 2011/070453 A2 | 6/2011 |

OTHER PUBLICATIONS

Brennan, Christopher Earls, "Cavitation and Bubble Dynamics", Oxford University Press 1995, ISBN 0-19-509409-3, http://caltechbook.library.caltech.edu/archive/00000001/bubble.htm, 254 pages.

Nano Resbots: Navigating the Reservoirs of Tomorrow, Saudi Aramco, Mar. 6, 2008, http./www.rigzone.com/news/article.asp?a_id=57957, 2 pages.

Gerhard Von Der Emde et al., "Electric fish measure distance in the dark" Nature, Oct. 29, 1998, vol. 395, pp. 890-894.

James R. Solberg et al., "Robotic Electrolocation: Active Underwater Target Localization with Electric Fields", Proceedings of the 2007 International Conference of Robotics and Automation (ICRA), Apr. 10-14, 2007, Rome, Italy.

James R. Solberg et al., "Active Electrolocation for Underwater Target Localization", The International Journal of Robotics Research, May 2008, vol. 27, No. 5, pgs. 529-548.

SPE 24824, "Fracture Measurement Using Hydraulic Impedance Testing", R.W. Page et al., Copyright 1992, Society of Petroleum Engineers, Inc., pp. 605-614.

SPE 77442, "A Practical Guide to Hydraulic Fracture Diagnostic Technologies", R.D. Barree et al., Copyright 2002, Society of Petroleum Engineers, Inc. pp. 1-12.

* cited by examiner

ELECTROLOCATION APPARATUS AND METHODS FOR PROVIDING INFORMATION ABOUT ONE OR MORE SUBTERRANEAN FEATURE

This application is a continuation-in-part of and claims priority to U.S. patent application Ser. No. 12/421,061, filed Apr. 9, 2009 now U.S. Pat. No. 8,253,417 and entitled "Electrolocation Apparatus and Methods for Mapping from a Subterranean Well", which claims priority to U.S. provisional patent application Ser. No. 61/044,153, filed Apr. 11, 2008 and entitled "Electrolocation Technique for Hydraulic Fracture Mapping", both of which are hereby incorporated by reference herein in their entireties.

FIELD OF THE INVENTION

The present disclosure relates generally to assessing geometry and other characteristics in and around subterranean wells and includes, for example, embodiments for estimating at least one dimension or other characteristic of an underground geological feature.

BACKGROUND OF THE INVENTION

In various operations conducted via underground wells, it is often advantageous to be able to gain information about one or more variables existing in the well bore or subterranean formation. In the arena of hydrocarbon exploration and production, example operations during which it may be beneficial to gain such information are drilling, cementing, completion, stimulation (including well treatment) and workover. The variables could be any measurable condition, parameter or property, such as one or more geometric dimension, the location of a particular object or geometric feature, temperature, pressure, flow, chemical composition, in-situ stresses in the well bore or formation, or the like. Note, the present disclosure is not limited by the type of operation, the target location in the well bore or formation or the type of variable.

In one example in the hydrocarbon recovery arena, it is often of significant benefit to learn about the geometry of an area within an underground well or subterranean formation, such as the location or dimensions of hydraulic fractures. Hydraulic fracturing is a widely used process for stimulating oil and gas wells and which typically involves injecting fluid into the well bore at a higher pressure than the surrounding reservoir pressure. The higher pressure of the injected fluids causes the formation to fracture, exposing the surface area through which oil or gas may flow.

Once hydraulic fractures are formed, it is believed to be advantageous to learn about or map out the geometry or dimensions of the fractures, such as to increase the effectiveness of the fracturing process and hydrocarbon production. For example, proppant is typically delivered into the fracture during well treatment to effectively increase the conductivity of the fracture and provide a flow path of hydrocarbons between the reservoir and the producing well bore. Proppants ensure the created flow path remains open and conductive after the treating pressure is relieved. Proper placement of the proppant is often considered one of the most critical facets of fracture stimulation. The propped fracture area is believed to directly correlate with stimulated well potential and productivity, whereby the larger the propped fracture, the more productive the well. It is thus typically advantageous to know the location and/or dimensions of propped fractures or proppant packs within conductive fractures. For example, knowledge of the location of proppant in fractures and/or the dimensions of propped fractures can, in some instances, assist in optimizing and improving fracturing efforts and proppant distribution, well placement and production strategies.

Existing techniques for visualizing underground geometries, such as hydraulic fracture propagations, include micro-seismic fracture mapping, tilt-meter fracture mapping and the use of tracers. These techniques are believed to have one or more drawbacks or limitations. For example, some of these techniques are believed to be limited to representing only one dimension of fracture geometry (e.g., length (depth), height or azimuth). For other examples, some of the current mapping technologies require the use of an offset well, which may dramatically increase costs, and/or radioactive material, which may be environmentally damaging.

It should be understood that the above-described discussion is provided for illustrative purposes only and is not intended to limit the scope or subject matter of this disclosure, the appended claims or the claims of any related patent application or patent. Thus, none of the appended claims or claims of any related patent application or patent should be limited by the above discussion or required to address, include or exclude the above-cited examples, features and/or disadvantages merely because of their mention above.

Accordingly, there exists a need for improved systems, apparatus and methods capable of estimating at least one dimension or other characteristic of an underground well or geological feature having one or more of the attributes, capabilities or features described or claimed below or evident from the appended drawings.

BRIEF SUMMARY OF THE DISCLOSURE

In some embodiments, the present disclosure involves a method of approximating or determining at least one dimension of at least one geological feature of an earthen formation. Each such geological feature is at least partially located within a zone of interest in the earthen formation proximate to a subterranean well bore. While the well bore and geological feature at least partially contain conductive fluid, the method includes generating an electric field in the zone of interest. At least one target object is located in the zone of interest, has an electrical impedance that differs from that of the conductive fluid and creates perturbations in the electric field. At least two sensing electrodes are provided in the well bore. The sensing electrodes are configured to detect differences therebetween in electric potential caused by the target object(s). At multiple different times and multiple different locations in the well bore, the sensing electrodes detect differences therebetween in electric potential caused by the target object(s) and provide data relating thereto to at least one data processing system. The data processing system approximates or determines at least one dimension of the geological feature in the earthen formation based at least partially upon data provided by the sensing electrodes, whereby the dimension(s) of at least one geological feature is approximated or determined with the use of electrolocation principles.

The present disclosure includes embodiments of a system for approximating or determining at least one dimension of at least one geological feature of an earthen formation from a subterranean well bore. The geological feature is at least partially located within a zone of interest in the earthen formation that is proximate to the well bore. The system includes a conductive fluid disposed in at least part of the well bore and geological feature. At least two spaced-apart electric field generating electrodes are configured to create a constant electric field in at least part of the zone of interest. At least one target object is disposed within the zone of interest outside the well bore, has a different electrical contrast as compared to the conductive fluid and is capable of creating perturbations in the electric field. At least two spaced-apart sensing electrodes are disposed within the well bore and configured to detect differences therebetween in electric potential measured in volts caused by the target object(s) and provide data relating thereto for use in approximating or determining at least one dimension of the geological feature(s). The sensing electrodes are configured to be movable relative to the target object(s) in order to detect electric potential differences at different times and locations.

Accordingly, the present disclosure includes features and advantages which are believed to enable it to advance underground investigation or mapping technology. Characteristics and potential advantages of the present disclosure described above and additional potential features and benefits will be readily apparent to those skilled in the art upon consideration of the following detailed description of various embodiments and referring to the accompanying drawings.

BRIEF DESCRIPTION OF THE DRAWINGS

The following figures are part of the present specification, included to demonstrate certain aspects of various embodiments of this disclosure and referenced in the detailed description herein.

DETAILED DESCRIPTION OF PREFERRED EMBODIMENTS

Figure 1:
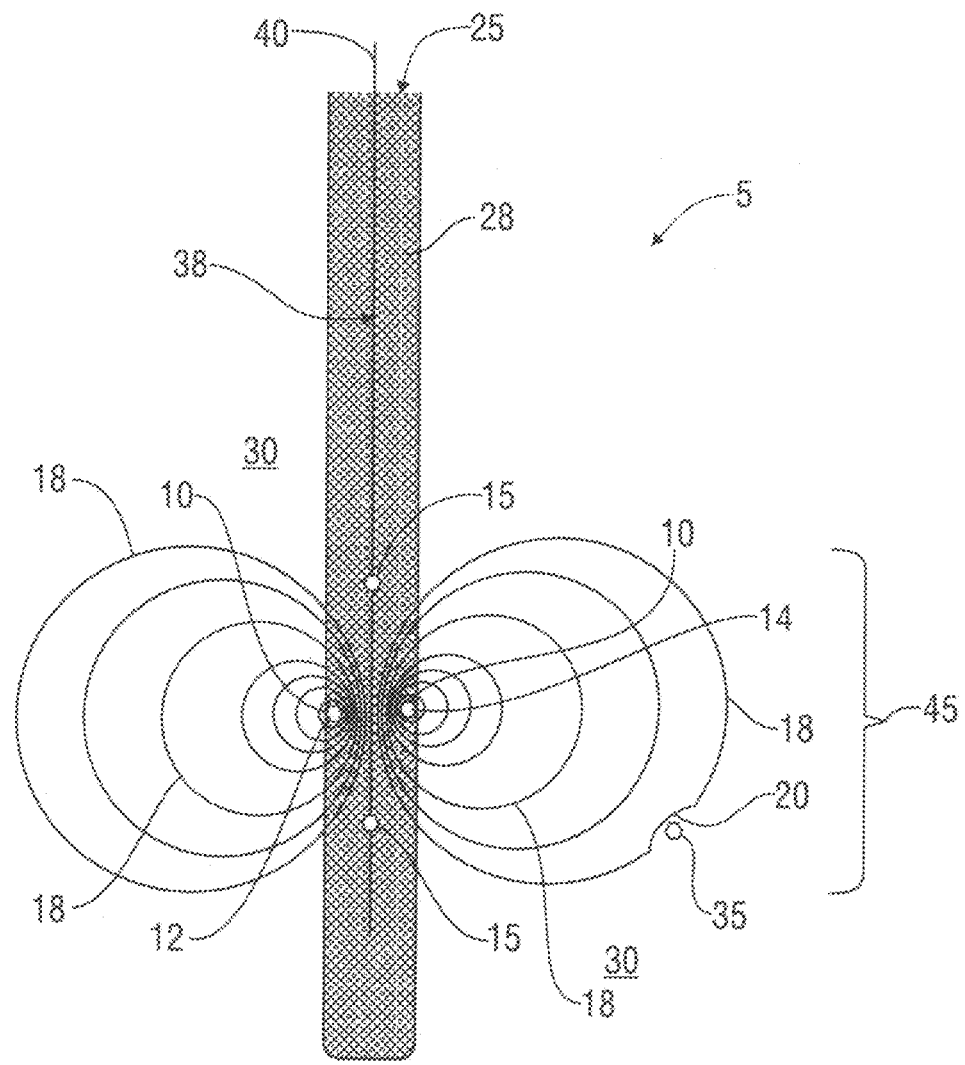
FIG. 1 is a schematic diagram showing an exemplary electrolocation system in accordance with an embodiment of the present disclosure.

Characteristics and advantages of the present disclosure and additional features and benefits will be readily apparent to those skilled in the art upon consideration of the following detailed description of exemplary embodiments of the present disclosure and referring to the accompanying figures. It should be understood that the description herein and appended drawings, being of example embodiments, are not intended to limit the claims of this patent application, any patent granted hereon or any patent or patent application claiming priority hereto. On the contrary, the intention is to cover all modifications, equivalents and alternatives falling within the spirit and scope of the claims. Many changes may be made to the particular embodiments and details disclosed herein without departing from such spirit and scope.

In showing and describing preferred embodiments, common or similar elements are referenced in the appended figures with like or identical reference numerals or are apparent from the figures and/or the description herein. The figures are not necessarily to scale and certain features and certain views of the figures may be shown exaggerated in scale or in schematic in the interest of clarity and conciseness.

As used herein and throughout various portions (and headings) of this patent application, the terms "invention", "present invention" and variations thereof are not intended to mean every possible embodiment encompassed by this disclosure or any particular claim(s). Thus, the subject matter of each such reference should not be considered as necessary for, or part of, every embodiment hereof or of any particular claim(s) merely because of such reference. The terms "coupled", "connected", "engaged" and the like, and variations thereof, as used herein and in the appended claims are intended to mean either an indirect or direct connection or engagement. Thus, if a first device couples to a second device, that connection may be through a direct connection, or through an indirect connection via other devices and connections.

Certain terms are used herein and in the appended claims to refer to particular components. As one skilled in the art will appreciate, different persons may refer to a component by different names. This document does not intend to distinguish between components that differ in name but not function. Also, the terms "including" and "comprising" are used herein and in the appended claims in an open-ended fashion, and thus should be interpreted to mean "including, but not limited to . . . ." Further, reference herein and in the appended claims to components and aspects in a singular tense does not necessarily limit the present disclosure or appended claims to only one such component or aspect, but should be interpreted generally to mean one or more, as may be suitable and desirable in each particular instance.

Referring initially to FIG. 1, an electrolocation system 5 in accordance with an embodiment of the present disclosure includes at least two electric field generating electrodes 10 and at least one sensing electrode 15 disposed within, or proximate to, an underground well bore 25. In this example, the well bore 25 is part of an open-hole (non-metallic cased) well or well-section. Fluid 28 is provided in the well bore 25, which is surrounded generally by an earthen formation 30. At least one target object 35 is at least partially located within a zone of interest 45 of the formation 30 adjacent to or near the well bore 25.

FIG. 1 illustrates exemplary electrodes 10 configured to create an electric field that reaches the zone of interest 45 and shows exemplary contour lines of equal electric potential 18. The sensing electrode(s) 15 detect perturbations 20 in the electric field caused by the target object(s) 35. To create the electric field, one or more of the electric field generating electrodes 10 is positively charged and thus serves a positive electric field generating electrode (e.g. electrode 12) and another one or more of the electric field generating electrodes 10 is negatively charged and thus serves as a negative, or return, electric field generating electrode (e.g. electrode 14). However, in some embodiments, any of the electrodes 10 may serve as either a positive electric field generating electrode 12 or a negative electric field generating electrode 14 and may change or alternate polarity during usage. Based upon data collected by the sensing electrodes 15 and with the application of electrolocation principals, at least one dimension or other characteristic of at least one portion of, or feature in, the formation 30 in the zone of interest 45, the well bore 25 or a geometric interface therebetween may be determined or estimated.

Any suitable conductive fluid 28 is provided in the well bore 25 to allow the electric field to be created and perturbations to be detectable. For example, the fluid 28 may be fracturing fluid introduced during hydraulic fracture formation.

Without being limited by theory, "electrolocation" is known to generally involve an electric field generated in a medium and objects located in the medium. The objects differ in impedance from the medium and other objects therein, and create distortions, or perturbations, in the electric field that can be detected by sensors. It should be noted, however, that while this general concept or process is referred to herein as "electrolocation", it may be referred to with the use of any other suitable terms, such as "electrosensing" and the like. Thus, the use of the term "electrolocation" is not intended to and should not be construed to be limiting upon the present disclosed or appended claims. The detected data can be used to estimate or determine one or more characteristic of the objects such as, for example, the location of the objects. Further details about electrolocation and example electrolocation techniques, systems, applications and mathematical models relating thereto may be found in various publicly accessible documents and sources, including, without limitation, the article Emde et al., "Electric Fish Measure Distance in the Dark," Nature, vol. 395, pgs. 890-894 (Oct. 29, 1998), the article Solberg et al., "Robotic Electrolocation: Active Underwater Target Localization with Electric Fields," Proceedings of the 2007 International Conference on Robotics and Automation (ICRA), Apr. 10-14, 2007, Rome, Italy, pp. 1-16, and the article Solberg et al., "Active Electrolocation for Underwater Target Localization," The International Journal of Robotics Research, Vol. 27, No. 5, May 2008, pp. 529-548, each of which is hereby incorporated by reference herein in its entirety. However, the present disclosure is not limited to the details, techniques or applications disclosed in any of the above or any other references.

The electrolocation system 5 of the embodiment of FIG. 1 is located in-situ in the well bore 25 without requiring the use of an offset well (not shown). The electrodes 10, 15 of the illustrated system 5 are disposed on a carrier 38, such as a wireline 40, which can be inserted into, moved within and removed from the well bore 25. However, the electrodes 10, 15 may be positioned or delivered in any other suitable manner. For example, some or all of the electrodes 10, 15 may be disposed upon one or more pads (not shown) that are movable within the well bore 25. For another example, some or all of the electrodes 10, 15 may be carried on one or more drill string or other pipe, coiled tubing, tool or other component (not shown) moveable within the well bore 25. In yet other embodiments, some or all of the electrodes 10, 15 may be attached to or embedded in a casing (not shown) disposed in the well bore 25. For example, the electrodes 10, 15 may be affixed to the outer diameter of the casing. When some or all of the electrodes 10, 15 are embedded in or affixed to metallic casing, special arrangements of electrodes 10, 15 may be required to be able to measure perturbations caused by the target object(s) 35. Evaluating through-casing resistivity for measuring current leakage may be necessary to sufficiently remove the influence or effect of the casing for accurate data recovery and analysis. For yet another example, some or all of the electrodes 10, 15 may be embedded in or affixed to a non-conductive casing, or casing that does not strongly disturb the electric field, such as a composite casing. In other embodiments, some or all of the electrodes 10, 15 may be attached to or embedded in another component, fixture or area proximate to the casing, such as insulation or cement.

Referring still to FIG. 1, the electric field generating electrode(s) 10 may have any desired dimensions, form, construction, configuration, arrangement and operation suitable for creating an electric field. Without limitation, examples of suitable electric field generating electrodes 10 may include metal pieces or wire constructed of or coated with silver, gold, or other highly conductive materials. In the illustrated embodiment, the system 5 includes one positive electric field generating electrode 12 and one negative electric field generating electrode 14. However, in other embodiments, the system 5 may include any desired quantity of positive and negative electric field generating electrodes 12, 14. For example, the system 5 may include a single positive electric field generating electrode 12 (not shown), such as an elongated highly conductive metal piece, along with a multitude of negative electric field generating electrodes 14, all disposed within the well bore 25. For another example, one or more positive electric field generating electrodes 12 may be disposed within the well bore 25 and one or more negative electric field generating electrodes 14 may be located at or near the earth's surface (not shown) or another location outside the well bore 25.

The electric field generating electrodes 10 may be spaced apart by any desired distance to provide the desired electric field. Generally, the size of the electric field and depth of penetration into the formation 30 may be affected by the quantity and/or relative positioning of the electric field generating electrodes 10. Moreover, the actual arrangement of electrodes 10, 15 may depend upon the particular application. For example, in some applications, a large number of electric field generating electrodes 10, such as ten, fifteen, twenty, thirty, etc., disposed along and spaced apart on a single wire, or other elongated carrier, in the well bore 25 will provide a larger depth of electric field penetration than a pair of electrodes 10 disposed at opposite ends of the wire.

Still referring to FIG. 1, the sensing electrode(s) 15 may have any desired dimensions, form, construction, configuration, arrangement and operation suitable for detecting perturbations 20 in the created electric field. Without limitation, examples of suitable sensing electrodes 15 may include metal pieces or wire constructed of or coated with silver, gold, or other highly conductive materials. In other embodiments, the sensing electrodes 15 may be more sophisticated (even multi-purpose) sensors, as are and become further known. In this embodiment, the system 5 includes two sensing electrodes 15. However, in other embodiments, the system 5 may include only one, or more than two, sensing electrodes 15. For example, in some embodiments, the system 5 may include a multitude, such as twenty, sensing electrodes 15. (It should be noted that in embodiments involving only one sensing electrode 15, it may be necessary or desirable to include at least one ground (e.g. metallic casing) or reference voltage disposed within or proximate to the well bore 25.)

The exemplary sensing electrodes 15 may be positioned at any desired location suitable for detecting perturbations 20 in the created electric field. In the illustrated embodiment, the sensing electrodes 15 are suitably positioned in the well bore 25 in or along the zone of interest 45 in the formation 30 to be able to detect perturbations 20 in the electric field caused by the target object(s) 35. In another embodiment, for example, a system 5 may include multiple pairs of electric field generating electrodes 10 spaced apart in a single line, such as by 1", and multiple sensing electrodes 15 offset relative thereto.

Still referring to the example of FIG. 1, the target objects 35 may be located in the zone of interest 45 in any suitable manner and include any desired structure, object or material capable of creating detectable perturbations in the electric field useful to approximate or determine the desired dimension(s) or other characteristics of the subject geological feature or area. For example, the target object(s) 35 may be part of the earthen formation 30, such as one or more hydraulic fractures or fracture surfaces (not shown), that will display a sufficient electrical (resistivity) contrast to everything else in the well bore 25 and/or zone of interest 45 (e.g. fluid, proppants, rock) to produce meaningful perturbation data. For another example, the target object(s) 35 may be one or more object(s) or material(s) positioned in one or more hydraulic fracture(s) and which possesses an electrical impedance that differs from the impedance of the fluid 28 and/or other objects and structures in the well bore 25 and zone of interest 45. In some instances, the target objects 35 may be proppant placed into the hydraulic fracture(s) and which have sufficient electrical contrast. As used herein, the term "proppant" includes any substance, composite or fluid-particle mixture useful for assisting in propping open a fracture, crack or other area in an underground earthen formation, or other desired purpose in a well bore or subterranean formation. While the presence of proppant in the fracture may not be necessary to measure perturbations of various target objects, it may, in at least some situations, make the perturbations stronger and thus assist in obtaining useful data. When proppant is relied upon to conduct electric current, the proppant particles should preferably be in contact with one another and the fracture wall.

In yet other embodiments, the target objects 35 may be material or particles contained within or carried by fluid 28 or proppant provided in the well bore 25. Some examples are beads constructed of or coated with metal, plastic or other material capable of raising or lowering electrical conductivity, as may be desired depending upon the particular well conditions. In even other embodiments, the target objects 35 may include particles, such as, for example, nanoparticles, suspended in the fracturing or other fluid in the well bore 25.

In any case, any suitable material may be used as target objects 35 or altered to provide a sufficient difference in electrical impedance as compared to the fluid 28, formation 30 and other material and objects in the well bore 25 and zone of interest 45 to create perturbations 20 in the electric field that may be detected by the sensing electrodes 15. Likewise, if desired, the target objects 35 may include a combination of the above or other examples. Moreover, different target objects 35 may be used at different times during operation of the system 5. For example, in some applications, perturbations or electric potential may be measured from a well bore 25 before a fracture is formed (when there may be no target objects present), during or after formation of the fracture and after fracture closure (with proppant in the fracture), each scenario potentially involving different target objects 35.

If desired, the target objects 35 may have a tunable, or variable, electrical impedance and thus be functionalized target objects. Increasing or decreasing the impedance of the functionalized target object could be useful to cause a desired interaction with the electric field and improve data accuracy based upon particular conditions in the well bore 25. Target objects 35 may be functionalized in any suitable manner. For example, particles having a desired impedance may be added to the target objects 35 to make them functionalized target objects. In some embodiments, the particles may be coated onto, integrated into or mixed with the target objects 35. For one example, when the target objects 35 include nanoparticles suspended in fracturing fluid, iron nanoparticles may be added to increase the conductivity and decrease the resistance of the target objects 35 and provide the desired interaction with the electric field.

The electrolocation system 5 of FIG. 1 is configured to provide data for mapping or estimating one or more dimensions or other characteristics of at least one area or geological feature proximate to the well bore 25 and/or in the adjacent formation 30. In one exemplary application, the target objects 35 are located at one or more hydraulic fracture (not shown) formed in the formation 30 in the zone of interest 45. Perturbations 20 in the electric field caused by the target objects 35 are detected and used to deduce at least part of the geometry of the fractures. For example, one or more among the approximate length (depth), width, height and azimuth of one or more fracture may be at least partially deduced from the output of the sensing electrodes 15. In still further embodiments, the deduced geometry may include the entire geometry of the subject fracture(s).

Figure 2A:
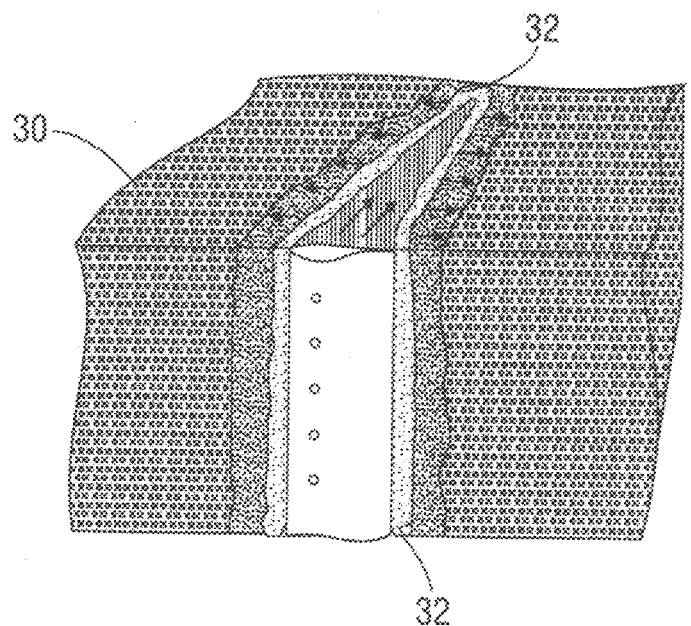
FIG. 2A is a perspective view of a wing of an exemplary bi-wing symmetrical hydraulic fracture formed in an earthen formation through hydraulic fracturing.

For example, FIG. 2A illustrates one wing (referred to as "fracture" 32) of a bi-wing symmetrical hydraulic fracture formed in the earthen formation 30 through hydraulic fracturing. In accordance with embodiments of the present disclosure, at least one dimension of the fracture 32 may be determined or estimated using electrolocation. For example, referring to FIG. 2B, the approximate width W and/or height H of the fracture 32 may be estimated.

Figure 2B:
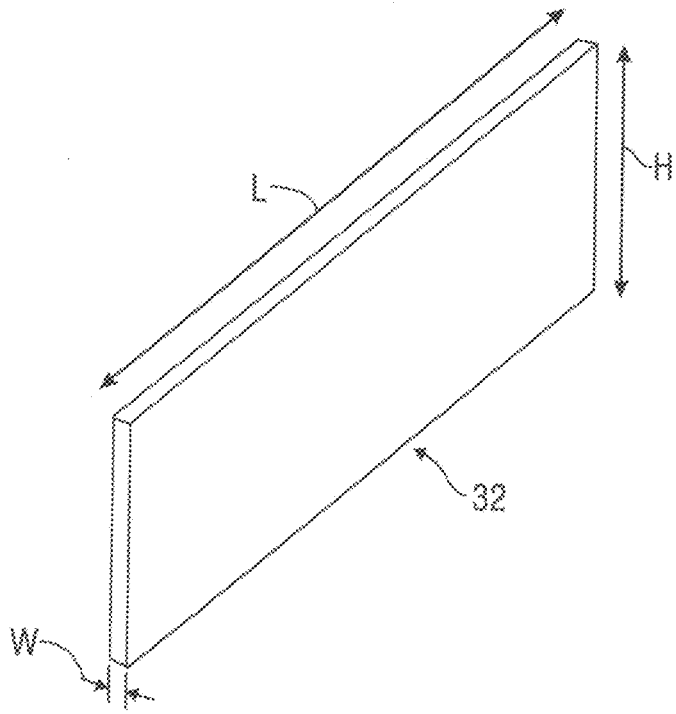
FIG. 2B is a schematic diagram showing the length, height and width of the hydraulic fracture wing shown in FIG. 2A.

For another example, in some embodiments, the length (depth) L of the fracture 32 may be estimated. (It should be noted that length L of FIG. 2B represents the length of one wing of the actual exemplary bi-wing fracture.) To provide a sufficient electric field to estimate length L of a fracture or other geological feature using electrolocation, a special arrangement of electrodes 10 and/or 15 may be necessary. For example, it may be necessary to expand the positioning and/or quantity of the positive electric field generating electrodes 12. In some applications, the depth of penetration into the formation 30 of the electric field by the positive electric field generating electrodes 12 may be equal to the length of the full line of electrodes 12 or twice that value. A multitude of positive electric field generating electrodes 12, such as twenty, may be spaced-apart in a single long line and directionally oriented toward the fracture 32 to synchronously inject current in parallel in the same direction to extend the full length L of the fracture 32. In other embodiments, a single elongated positive electric field generating electrode 12 may be used. A special electrode carrier (not used) may be necessary, such as to directionally or azimuthally arrange the electrodes 12. For example, the carrier may include one or more metal sheet shaped into a 30 or 60 degree angle. In any case, the necessary quantity and arrangement of the electrodes 12 may depend upon the particular application. Further, it may also be necessary to determine other variables, such as the volume, surface area, width W and/or height H of the fracture 32, in order to estimate length L.

However, the present disclosure is not limited to determining the above-described dimensions of hydraulic fractures. Other exemplary features that may be measured or mapped in accordance with the present disclosure are naturally occurring fractures, wormholes or channels created by matrix stimulation, and the like.

In an example operation of the embodiment of FIG. 1, any suitable fluid, such as fracturing fluid or a brine, is provided into at least part of the well bore 25 and zone of interest 45. The exemplary electric field generating electrodes 10 are spaced a pre-established or desired distance apart and disposed at a suitable location in the well bore 25 to provide an electric field in the zone of interest 45. The sensing electrodes 15 are spaced apart a pre-established, or desired, distance and disposed at a suitable location in the well bore 25 or formation 30 to detect perturbations of desired target objects 35 (or the absence thereof) in the zone of interest 45. The perturbations may, for example, represent a detected change in electrical impedance caused by structures of the formation 30, such as fractures formed therein, or material placed in the fractures, such as proppant or nanoparticles, such as described above.

In another sample operation of the embodiment of FIG. 1, the carrier 38 is lowered to a desired position (e.g. at or near the bottom or toe of the well bore 25) and a multitude of readings taken as the carrier 38 is moved axially and/or rotationally in the well bore 25. Perturbation readings are taken at different positions of the electrodes 10, 15 relative to the target object(s). In some cases, this process is repeated at different times in the development of the well or earthen formation, such as before fracturing the formation 30 (before or during the pumping of fracturing fluid into the well bore 25), when there may be no target objects 35, and after fracture closure. If desired, perturbations may be measured several times while fracturing fluid (or other conductive fluid or material) is penetrating the fracture, such as to assist in tracking the propagation thereof or identify the location and/or movement of the front end of the fracturing fluid (or other conductive fluid or material) in the fracture. Electric potential readings may be taken by the electrodes 15 prior to creation of geological features (e.g. hydraulic fractures), or in portions of the zone of interest 45 or other sections of the earthen formation, where there are no geological features. In some cases, there may be no target objects 35 present in the measured region and the electric potential difference determination may be zero Volts.

In many embodiments, the more readings taken by the electrodes 15 and the more positions of the electrodes 10, 15 for such readings, the greater the accuracy, usefulness and resolution of the resulting data. For example, it may be beneficial to vary the region or depth of investigation in the zone of interest 45 of the formation 30 by changing the position of the sensing electrodes 15 and utilizing signal processing techniques (e.g. switching signal processing modes). Also in some embodiments, the more electrodes 10, 15 included in the system 5, the less axial and rotational movement may be necessary for accurate and useful data. For example, different sensing electrodes 15 or sets of sensing electrodes 15 may be positioned at different depths in the well bore 25 so that each will detect perturbations to a certain depth. During the process of taking multiple perturbation measurements, it may be desirable to move one or more of the electrodes 10, 15 relative to one or more other electrode 10, 15 or the geological feature to be evaluated to optimize accuracy and usefulness of the results.

As described above, any suitable target objects 35 may be used to produce the desired data. For example, when the desired data involves dimensions of fractures in the formation, perturbation data may be recovered based upon the difference in electric conductivity between the fracture (hole) and the formation wall adjacent to the fracture and fluid 28 in the well bore 25. For another example, target objects 35, such as material having a different electrical conductivity, can be added to deliberately increase the electrical contrast and improve or enhance the perturbation readings.

Depending upon the accuracy or usefulness of the readings or changes in the downhole conditions, the impedance of the target objects 35 may be changed. In some instances, it may be desirable to add more or less conductive material to fracture fluid or proppants inserted into the fracture(s) to create a greater electrical contrast as compared to the fracture fluid itself, the proppant and/or earthen formation 30 around the fracture. Thus, at any stage in the exemplary process, if perturbation readings are insufficient, target objects 35 may be added or altered in any desired manner to increase or decrease electrical impedance and contrast, as necessary. For example, specialized proppants or particles, such as described above, may be inserted into the well bore 25 or mixed with fluid or proppants provided in the well bore 25.

Still referring to FIG. 1, the system 5 may be used in mapping or approximating one or more dimension of one or more fractures (or other geological feature) in the formation along multiple intervals or angles in the well bore 25. In some embodiments, the wireline 40 (or other carrier) may be moved upwardly in the well bore 25 to locate the corresponding electrodes 10, 15 at a desired second position, such as a next higher fracture interval or area within the same fracture interval. At that location, an electric field may be provided into a new zone of interest by the electric field generating electrodes 10 and perturbations from one or more target objects 35 therein may be measured by the sensing electrodes 25, such as described above. This process may be repeated at multiple successive locations, as desired, such as corresponding to hydraulic fracture intervals, pre-determined spacing intervals or based upon any other criteria.

In other embodiments, multiple sets of corresponding electrodes 10, 15 may be disposed on the same wireline 40 or other carrier at spaced intervals so that after the wireline 40 or carrier is lowered into the well, perturbations can be measured at multiple locations without completely repositioning the wireline 40 or other carrier. In still further embodiments, multiple sets of corresponding electrodes 10, 15 may be embedded in, or connected with, a casing (not shown) or other component or fixture in the well bore 25 (such as described above) at desired intervals to measure perturbations from target objects at different locations.

After data is obtained by the electrodes 15, any methods suitable for processing such information and ultimately deducing and/or mapping the desired dimensions, geometry or spatial relationships from the detected perturbations as is and become further known may be used. For example, a multitude of different electric potential readings from the sensing electrodes 15 taken at different times and/or locations may be used to map out the electric field, formation 30 and/or subject geological feature(s) in a series of iso-potential maps. One or more data processing system (computer or other computing device) may be used. The data processing system may be integrated with the electrodes 15, such as, for example, to dynamically control and vary the location and performance of the electrodes 10 and/or 15 and to process data. In the present embodiment, mathematical modeling techniques, as are and become further known, may be used to formulate and apply appropriate algorithms via one or more computing device to determine the relationship between detected perturbations and the boundaries or desired dimensions of associated fractures. As an example, the above-cited "Solberg" references, all of which are incorporated herein by reference in the entireties, disclose algorithms for determining locations based on detected electrical perturbations and inversion processing for inverting measure perturbations.

EXPERIMENTATION

Background

Experiments were conducted to illustrate principals applicable in accordance with an embodiment of the present disclosure. However, it should be understood that the present disclosure and appended claims are not strictly limited to any of the details of the experimentation as described below and shown in the referenced figures.

Figure 3A:
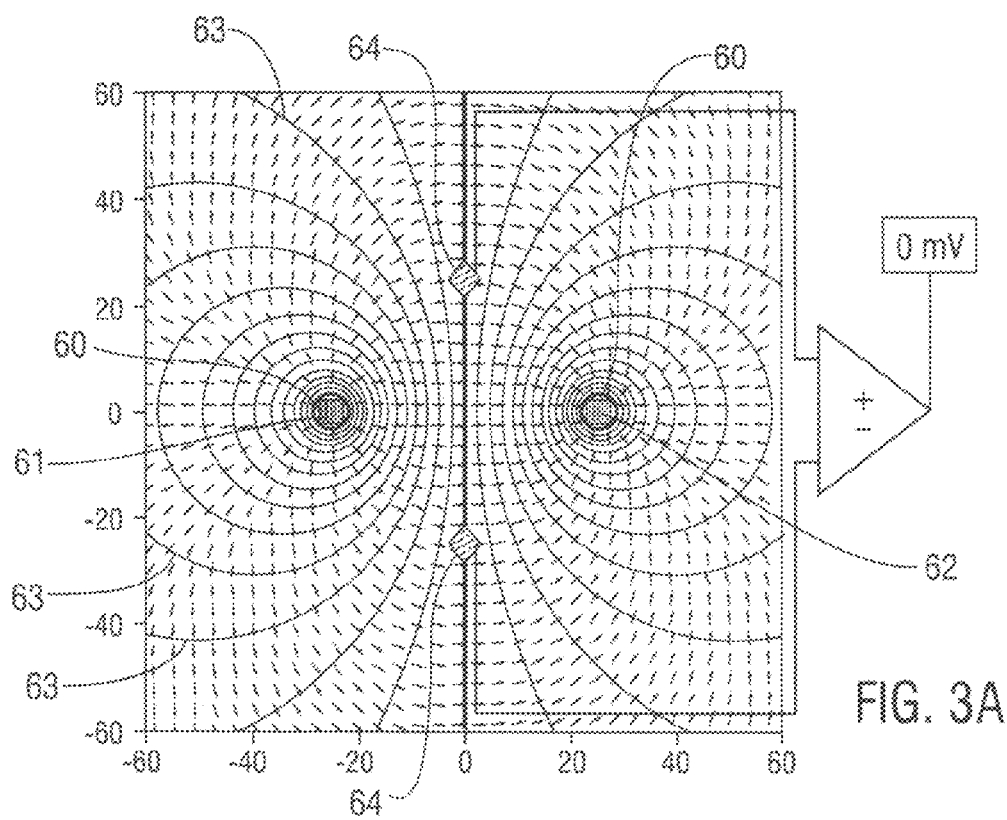
FIG. 3A is a schematic diagram of an unperturbed planar electric field shown to illustrate principals applicable in accordance with an embodiment of the present disclosure.

To experimentally verify the ability to approximate one or more dimension, geometric feature or spatial relationship in a well bore, a device was built to generate 2V (peak-to-peak) biphasic 1 kHz square wave. An electric field was generated between two submerged silver electrodes plated with silver chloride to improve the metal-water electrical interface. These electrodes are represented in FIG. 3A as the electric field generating electrodes 60, which were positioned approximately 50 mm apart. Two sensing electrodes 64 were positioned about 50 mm apart, forming an overall diamond pattern with the electric field generating electrodes 60. The pairs of electrodes 60, 64 made up the electrode assembly 66 (e.g. FIG. 6). Both the electric field generating electrodes 60 and the sensing electrodes 64 were constructed of 0.38 mm diameter silver wires that were stabilized by 0.5 mm borate silicate glass pipettes. However, the electrodes 60, 64 are not limited to this specific composition, geometry and arrangement, but may be constructed of other materials and designed and arranged as desired to accommodate differing conditions, such as in subterranean oilfield applications.

Figure 3B:
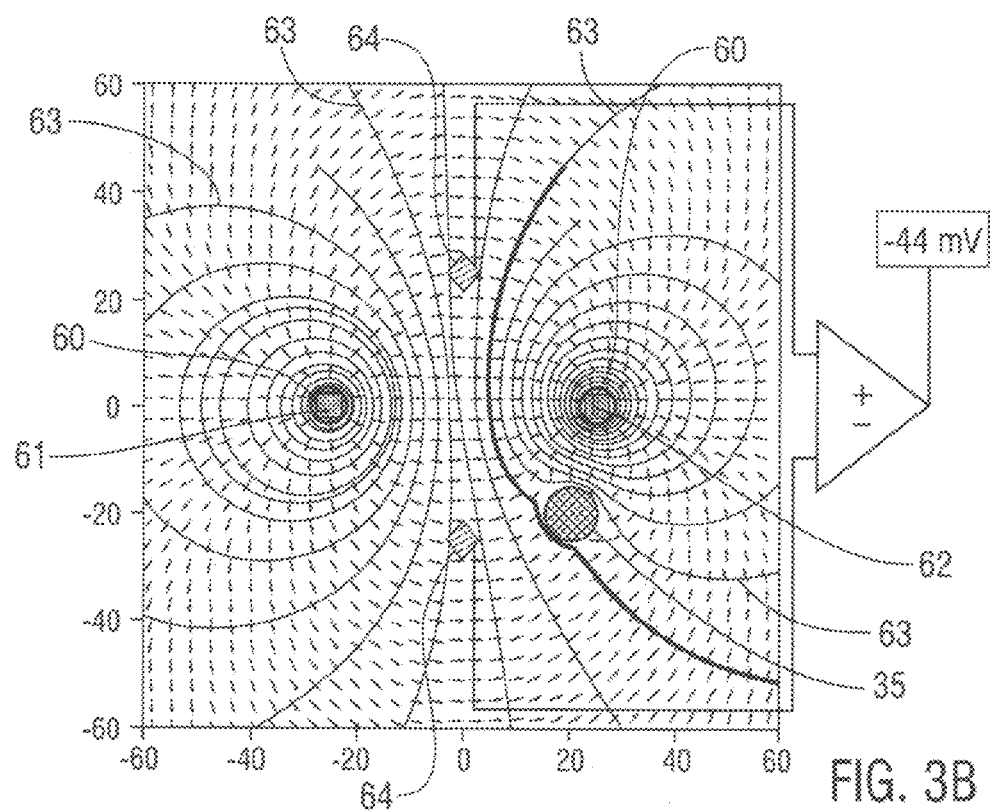
FIG. 3B is a schematic diagram of the planer electric field of FIG. 3A that is perturbed by a circular target object centered at x=20 and y=−20.

FIG. 3A illustrates an exemplary unperturbed planar electric field. The arrows represent the electric current flowing from the positive electric field generating electrode 61 to the negative electric field generating electrode 62. The contour lines 63 represent lines of equal electric potential. No target object is present to distort the electric field. The sensing electrodes 64 are positioned where they would give identical readings with no target objects present. Both electrodes 64 lie on the iso-potential contour of zero Volts so a zero voltage differential between the sensing electrodes 64 exists. For the purpose of illustration, FIG. 3B is provided to show the planar electric field representation of FIG. 3A perturbed by a circular target object 35, such as a perforation or hole in the wall of the well bore, centered at x=20 and y=−20. The top electrode 64 is reading 78 mV, while the bottom electrode 64 is reading 122 mV. Thus, in this example, there is a difference in potential between the respective sensing electrodes 64 of −44 mV.

In measuring perturbations caused by one or more target object, the signals recorded at the sensing electrodes 64 were differentially amplified and the resulting signal, along with its negative, was sent to an analog switch. The analog switch passed one of the two input signals to an output according to a switching signal, which was the original square-wave used to generate the electric field. This served as a matched filter, since only sensory signals having the same frequency as the field signal have a nonzero time-averaged mean at the output of the analog switch. The final stage was a low-pass filter that outputs this mean value.

Two computers were used for information processing. One computer ran a real-time operating system (xPC, The Mathworks, Natick Mass. USA) and handled low-level control of movement and recording and filtering of the measurements. A second computer received the filtered data from the real-time computer, generated the next position of the electrode assembly (readings were taken at multiple locations) and sent such information to the real-time computer. All algorithms were implemented with commercial software (Simulink, Real Time Workshop, xPC Target, and MATLAB: The Mathworks, Natick Mass. USA).

Experiments were conducted in a 750 mm by 750 mm glass tank 70 (e.g. FIG. 4) filled to a depth of approximately 160 mm. In order to minimize the effects of the tank walls on the electric field, experiments were conducted in a central region of 200 mm by 200 mm. Low concentration of NaCl aqueous solution 74 (e.g. FIG. 4) was used in the experiments, although other types of brines may instead be used. All tests were done at ambient conditions.

Experiment #1

Measurement of the Gaps Between Sandstone Rocks

Figure 4:
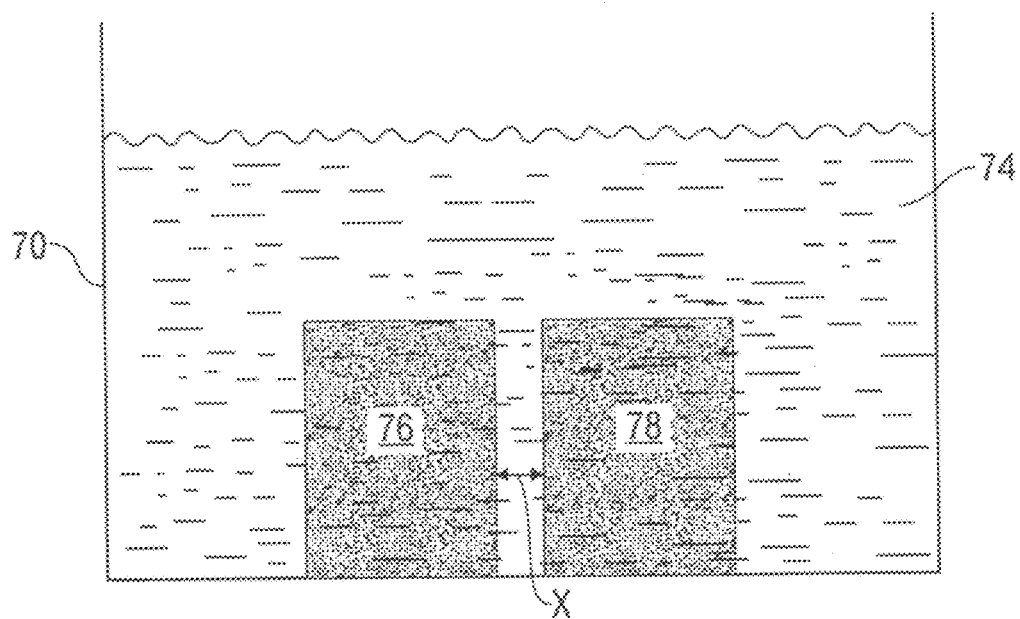
FIG. 4 is a front view of an example testing tank with experimental sandstone pieces used in a first example experiment to illustrate principals applicable in accordance with an embodiment of the present disclosure.

As shown in FIG. 4, two pieces of sandstone rock 76, 78 were placed in the tank 70 and separated by gap x. The facing sides of the sandstone pieces 76, 78 represented the target objects. This experiment simulated using electrolocation to measure the width and height of a crack, such as a fracture in an earthen formation. The electric field potential was measured (as outlined above) and an isopotential map was produced. This process was repeated multiple times, each time varying the gap (x value) ranging from 0-16 mm.

Figure 5:
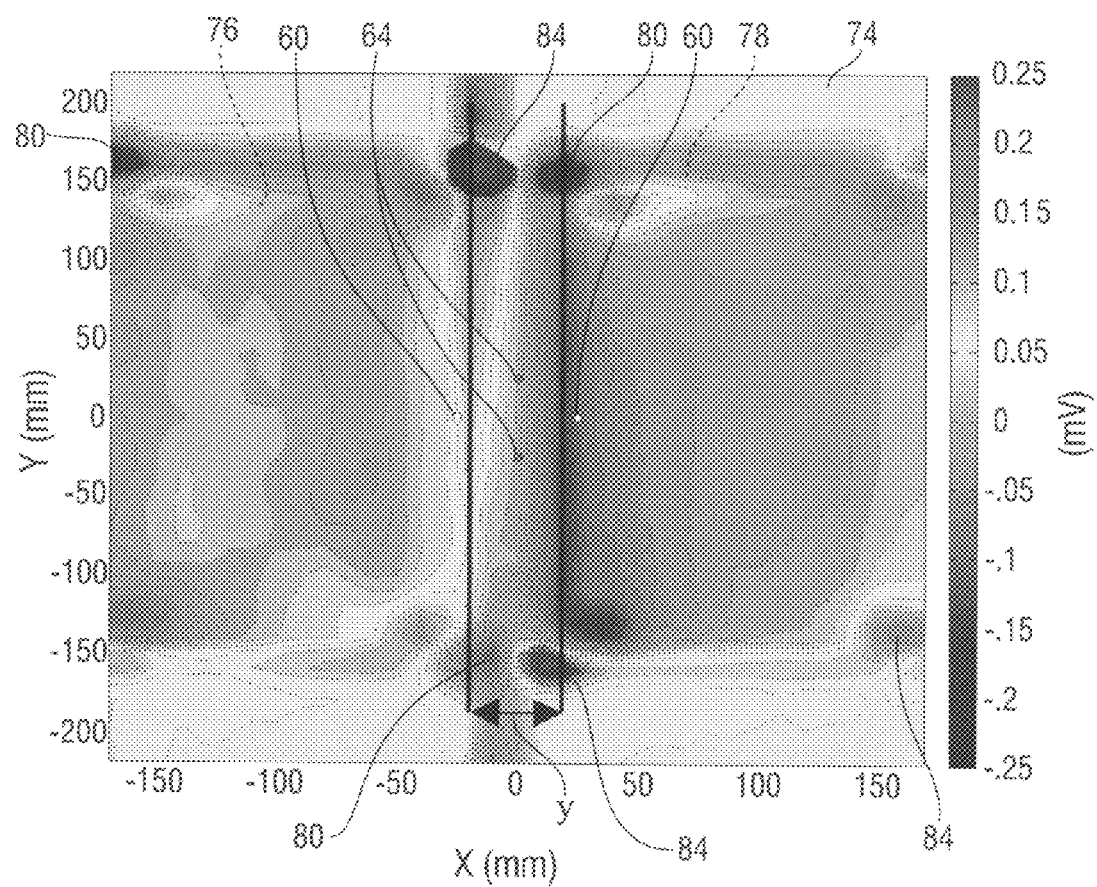
FIG. 5 is a two-dimensional iso-potential map from a three-dimensional graphical representation showing results generated in the first example experiment.

FIG. 5 illustrates an example isopotential map that was generated. The side bar indicates the difference in electric potential in my and the x and y axes correspond to the reading of coordinates. Electrical potential that was lower than that of the fluid is represented in blue. The areas of lowest potential are represented with concentrated blue areas, or lobe slices 80. Electrical potential that was higher than that of the fluid is represented in red. The areas of highest potential are represented with concentrated red areas, or lobe slices 84.

As shown, the map provides a general outline of the blocks 76, 78 based upon voltage. A gap "y" is clearly visible between the isopotential contours, or lobe slices, 80, 84 in the middle region of the map, representing differences in electrical impedance between the saltwater 74 and sandstone pieces 76, 78. The highest potential difference is thus shown generated at the gap y, representing where the blocks 76, 78 were separated. The measured gap between the lobe slices 80, 84 is proportional to the actual gap x (FIG. 4) between the sandstone pieces 76, 78. Further, the length of the gap y corresponds with the length of the gap between the blocks 76, 78. A y-value was obtained in each successive isopotential map generated after adjusting the gap (x values) in the different runs. Results demonstrated linear relationship between x and y, as y∝x. indicating this methodology can be used to determine underground fracture width and also length.

EXPERIMENT #2

Measurement of Diameters of the Holes in a Sandstone Rock

Figure 6:
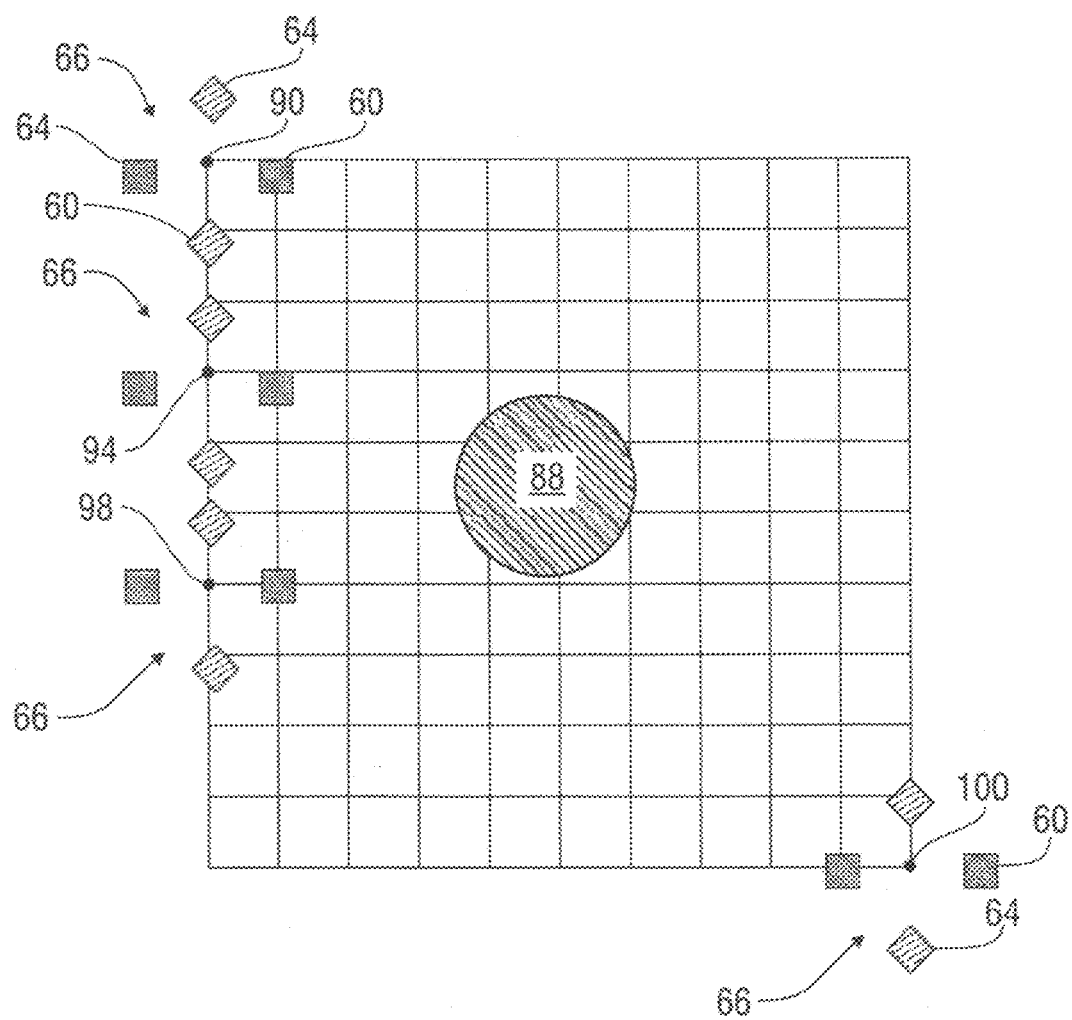
FIG. 6 is a schematic diagram showing the placement of an example electrode assembly relative to a hole formed in a sandstone piece used in a second example experiment to illustrate principals applicable in accordance with an embodiment of the present disclosure.

Referring to FIG. 6, a piece of sandstone rock with a hole 88 was placed in the tank. The electrode assembly 66 was placed in a first position 90 above the sandstone rock relative to the hole 88 and the electric field potential was measured (by steps outlined above). The electrode assembly 66 was moved to a second position 94, then to a third position 98 etc. to the nth position 100 according to the grid pattern illustrated in FIG. 6 to cover the entire area over the rock, with electric field potential measured at each position.

Figure 7:
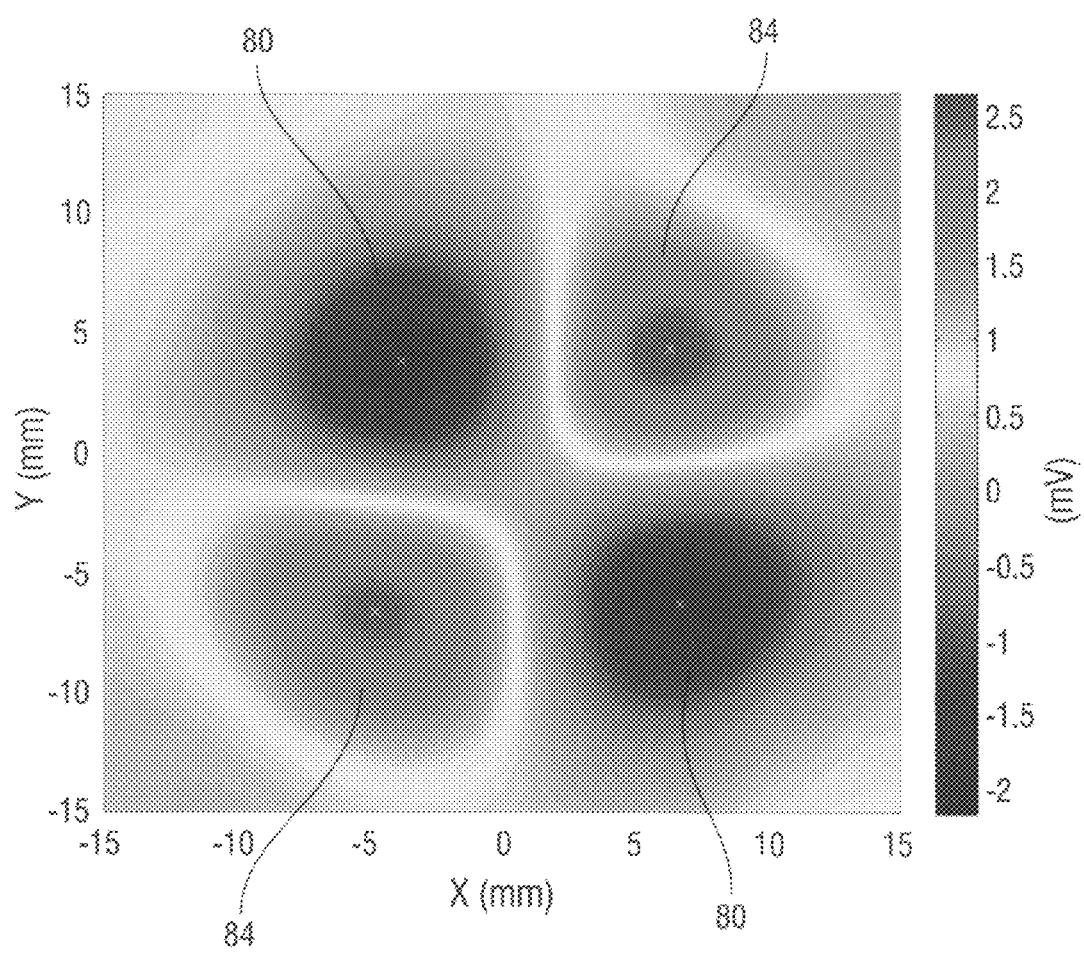
FIG. 7 is a two-dimensional iso-potential map from a three-dimensional graphical representation showing results generated in the second example experiment.

The information gathered was used to generate the electric field isopotential map shown in FIG. 7. The side bar indicates the difference in electric potential in mV and the x and y axes correspond to the reading of coordinates. The distance between the centers (x) of the lobe slices 80, 84, or lobe peak radius (LPR), was measured and averaged.

Multiple shapes of sandstone rock with holes 88 of different diameters (ranging from 4 mm to 16 mm) were tested. Each sandstone rock was independently placed in the tank. The electric field potential was measured for each rock and an isopotential map produced. The average LPR was measured and calculated for each map.

Figure 8:
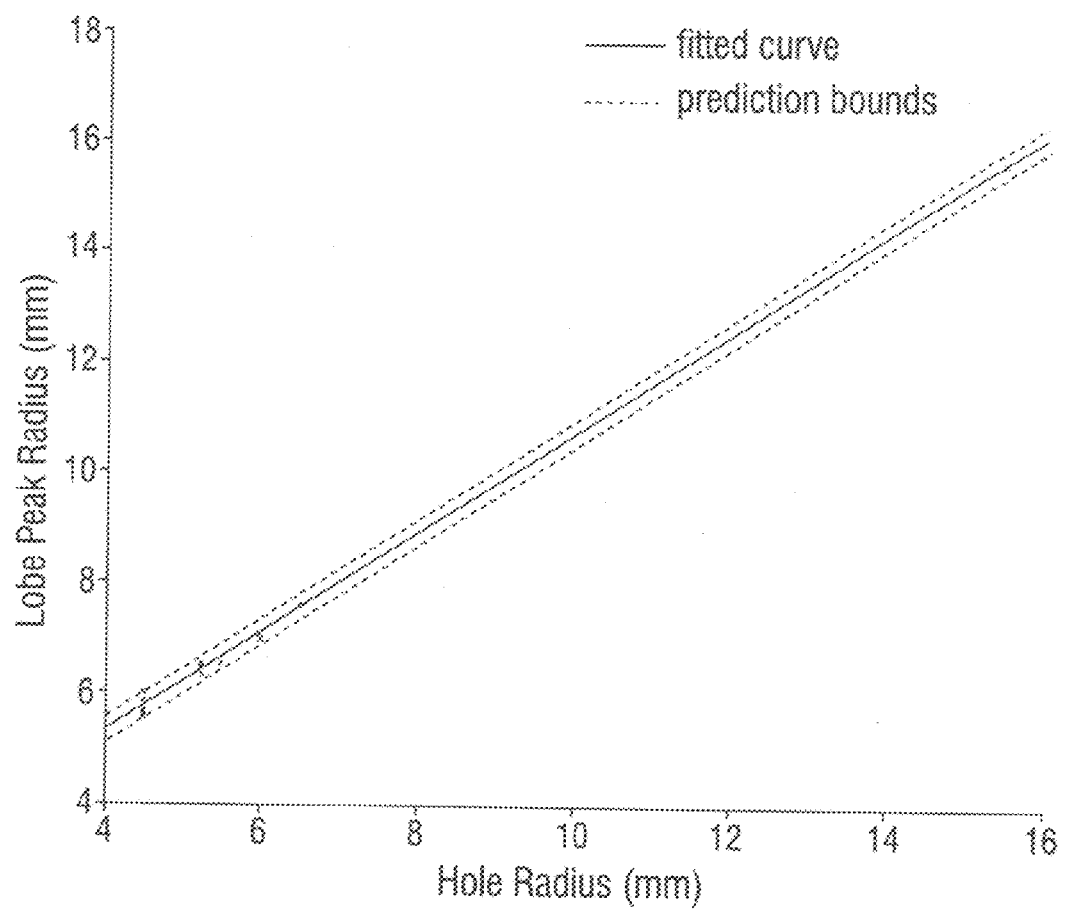
FIG. 8 is a graph showing results and predicted bounds deduced therefrom from the second example experiment.

The average LPR and corresponding hole radiuses were plotted in FIG. 8 (n=22) and generated the algorithm LPR=0.90*HR+1.71, where HR is the hole radius. The resulting fitted curve and prediction bounds shows a clear linear relationship between the diameter of the hole in each rock and the distance between the mapped lobes, indicating that the distance between the peaks x of the lobe slices 80, 84 is proportional to the hole diameter. In an application having a hole in a rock with an unknown diameter, and the average distance between the lobe centers will lead to the diameter of the hole. This experiment demonstrated that the diameter of a hole can be determined using electrolocation.

Experiment #3

Depth Measurements of a Hole or Fracture in Sandstone Formation

Figure 9:
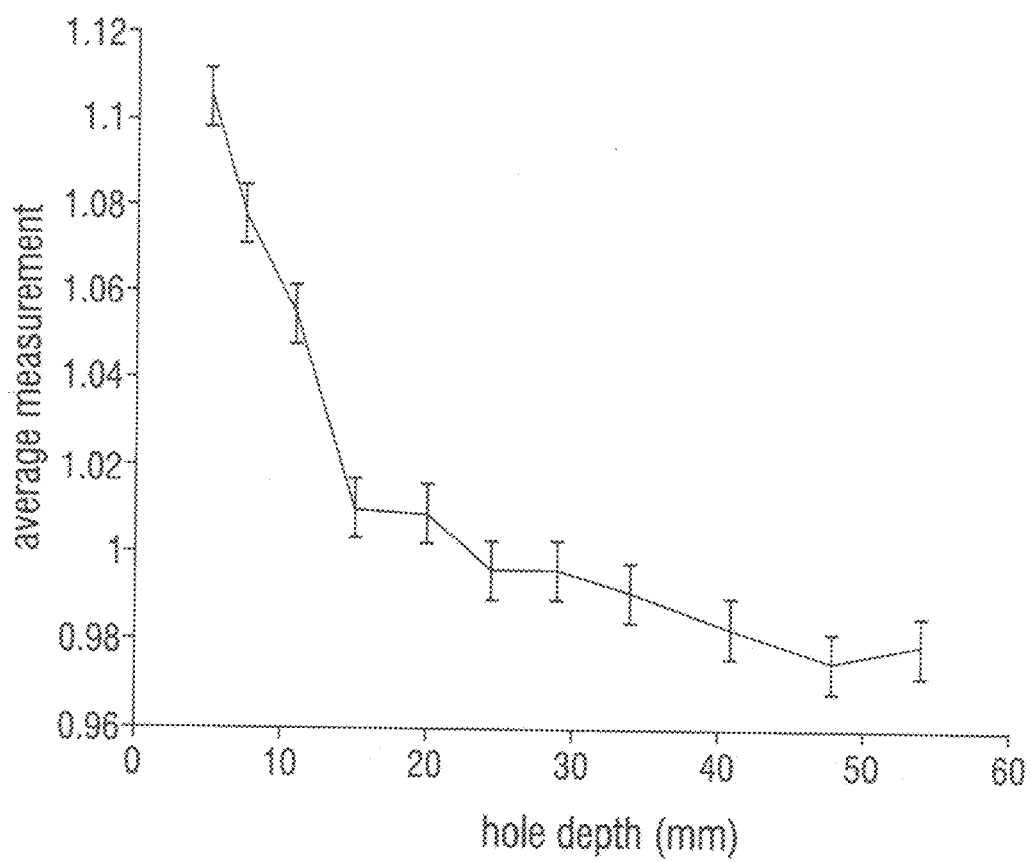
FIG. 9 is a graph of results from a third example experiment to illustrate principals applicable in accordance with an embodiment of the present disclosure.

In this experiment, two sensing electrodes and the two electric field emitter electrodes were embedded 15 mm deep into a sandstone rock placed in the tank. A 7 mm diameter hole was drilled in the center of the rock and 17 mm from each of the four electrodes. The depth of the hole was increased gradually and the electric potential was measured at each increment of hole depth. An increase in hole depth leads to a change in the conductivity between electrodes, which creates a voltage differential. A relationship between the average voltage differential between electrodes and the depth of the hole was established, as shown in FIG. 9. The value of the hole depth was accurate up to at least three times the depth of the electrodes. Such a relationship indicates that electrolocation may be useful to measure the depth of a fracture or hole in a formation rock.

Preferred embodiments of the present disclosure thus offer advantages over the prior art and are well adapted to carry out one or more of the objects of this disclosure. However, the present invention does not require each of the components and acts described above and is in no way limited to the above-described embodiments, methods of operation, variables, values or value ranges. Any one or more of the above components, features and processes may be employed in any suitable configuration without inclusion of other such components, features and processes. Moreover, the present invention includes additional features, capabilities, functions, methods, uses and applications that have not been specifically addressed herein but are, or will become, apparent from the description herein, the appended drawings and claims.

The methods that are provided in or apparent from the description above or claimed herein, and any other methods which may fall within the scope of the appended claims, may be performed in any desired suitable order and are not necessarily limited to any sequence described herein or as may be listed in the appended claims. Further, the methods of the present invention do not necessarily require use of the particular embodiments shown and described herein, but are equally applicable with any other suitable structure, form and configuration of components.

While exemplary embodiments of the invention have been shown and described, many variations, modifications and/or changes of the system, apparatus and methods of the present invention, such as in the components, details of construction and operation, arrangement of parts and/or methods of use, are possible, contemplated by the patent applicant(s), within the scope of the appended claims, and may be made and used by one of ordinary skill in the art without departing from the spirit or teachings of the invention and scope of appended claims. Thus, all matter herein set forth or shown in the accompanying drawings should be interpreted as illustrative, and the scope of the disclosure and the appended claims should not be limited to the embodiments described and shown herein.

The invention claimed is:

1. A method of approximating or determining at least one dimension of at least one underground geological feature of an earthen formation using electrolocation, the at least one geological feature being at least partially located within a zone of interest in the earthen formation proximate to a subterranean well bore, the method comprising:
    while the well bore and geological feature at least partially contain conductive fluid,
    generating an electric field in the zone of interest,
    at least one target object in the zone of interest having an electrical impedance that differs from the electrical impedance of the conductive fluid and creating perturbations in the electric field,
    providing at least two sensing electrodes in the well bore, the sensing electrodes being configured to detect differences therebetween in electric potential caused by the at least one target object,
    at multiple different times and multiple different locations in the well bore, the sensing electrodes detecting differences therebetween in electric potential caused by at least one target object and providing data relating thereto to at least one data processing system; and
    the at least one data processing system approximating or determining at least one dimension of at least one geological feature in the earthen formation based at least partially upon data provided by the sensing electrodes.

2. The method of claim 1 further including
    moving the sensing electrodes axially and rotationally in the well bore; and
    at each among multiple different axial and rotational positions of the sensing electrodes in the well bore, the sensing electrodes detecting differences therebetween in electric potential caused by at least one target object.

3. The method of claim 1 further including
    providing a plurality of spaced-apart, positive electric field generating electrodes arranged in a single line along the longitudinal axis of the well bore; and
    providing at least one negative electric field generating electrode outside the well bore,
    wherein the positive and negative electric field generating electrodes generate the electric field in the zone of interest.

4. The method of claim 1 further including
    providing a single elongated positive electric field generating electrode within the well bore and extending along the longitudinal axis thereof; and
    providing at least one negative electric field generating electrode,
    wherein the positive and negative electric field generating electrodes generate the electric field in the zone of interest.

5. The method of claim 1 wherein the at least one geological feature includes multiple fractures created in the earthen formation by hydraulic fracturing and extending at least partially into the zone of interest, further including producing a series of iso-potential maps of at least part of the zone of interest to illustrate at least one dimension of each of the created fractures.

6. The method of claim 1 further including
providing a plurality of spaced-apart electric field generating electrodes in the well bore;
the electric field generating electrodes generating the electric field;
affixing at least one among at least one sensing electrode and at least one electric field generating electrode to a casing in the well bore; and
evaluating through-casing resistivity to assist in neutralizing the influence of the casing on the electric potential measurements taken by the sensing electrodes.

7. The method of claim 1 further including the at least one data processing system using inversion processing to assist in approximating or determining at least one dimension of at least one geological feature in the earthen formation based at least partially upon data provided by the sensing electrodes.

8. The method of claim 1 further including at least one among adding or altering target objects in the well bore and at least one geological feature to increase the difference in electrical impedance between the target objects and conductive fluid and improve perturbation readings by the sensing electrodes.

9. The method of claim 1 further including
moving the sensing electrodes relative to the at least one target object; and
the sensing electrodes detecting differences therebetween in electric potential caused by at least one target object at multiple different times and positions of the sensing electrodes relative to the at least one target object.

10. The method of claim 9 further including
providing at least two spaced-apart electric field generating electrodes in the well bore, the electric field generating electrodes generating the electric field in the zone of interest; and
moving the electric field generating electrodes in the well bore concurrently with moving the sensing electrodes in the well bore.

11. The method of claim 10 further including disposing the electric field generating electrodes and sensing electrodes on a common carrier that is moveable into, within and out of the well bore.

12. The method of claim 11 further including moving the carrier between multiple positions within the well bore to allow the sensing electrodes to provide electric potential data useful for estimating or determining at least one among the height and width of a plurality of geological features in the earthen formation at different intervals or angles along the well bore, wherein at least one among the width and height of each of the plurality of geological features may be approximated or determined based at least partially upon data obtained by the sensing electrodes during a single trip into the well bore.

13. The method of claim 1 further including
providing a plurality of spaced-apart positive electric field generating electrodes arranged in a single line along the longitudinal axis of the well bore; and
providing at least one negative electric field generating electrode within the well bore,
wherein the positive and negative electric field generating electrodes generate the electric field in the zone of interest.

14. The method of claim 13 further including
directionally oriented the positive electric field generating electrodes in the direction of at the least one geological feature; and
the positive electric field generating electrodes synchronously injecting current in parallel in the same direction to create the electric field over the full length of the at least one geological feature in the zone of interest,
wherein the length of the at least one geological feature may be approximated or determined based at least partially upon data obtained by the sensing electrodes.

15. The method of claim 1 wherein the at least one geological feature includes at least one fracture created in the earthen formation by hydraulic fracturing and extending at least partially into the zone of interest, further wherein the at least one dimension includes at least one among the height, width and length of the at least one fracture.

16. The method of claim 15 further including providing functionalized target objects and wherein the conductive fluid includes fracturing fluid.

17. The method of claim 15, further including
the sensing electrodes detecting differences therebetween in electric potential caused by at least one target object during first and second detection phases to provide at least first and second corresponding respective sets of data, wherein in the first detection phase, the at least one target object includes the wall of at least one created fracture and, in the second detection phase, the at least one target object includes proppant placed into at least one created fracture; and
analyzing, processing or comparing the first and second sets of data to assist in determining at least one among the width and height of the at least one created fracture.

18. The method of claim 17, further including
the sensing electrodes measuring electric potential in the electric field before creation of the at least one fracture and providing a third set of data relating thereto; and
comparing the third set of data with at least one among the first and second sets of data to assist in determining at least one among the width and height of the at least one created fracture.

19. The method of claim 18, further including
the sensing electrodes measuring electric potential in the electric field in one or more area of the zone of interest that does not include at least one created fracture and providing a fourth set of data relating thereto; and
comparing the fourth set of data with at least one among the first, second and third sets of data to assist in determining at least one dimension of the at least one created fracture.

20. The method of claim 1 further including
providing a plurality of spaced-apart electric field generating electrodes in the well bore,
the electric field generating electrodes generating the electric field; and
positioning the sensing electrodes and electric field generating electrode in fixed positions in the well bore.

21. The method of claim 20 further including
providing multiple sets of associated electric field generating and sensing electrodes disposed at different positions upon or within at least one among a casing, cement, insulation or liner;
the electric field generating electrodes configured to create electric fields in multiple locations in the earthen formation; and the sensing electrodes configured to detect differences in electric potential created by multiple target objects at different locations in the earthen formation.

22. A system for approximating or determining at least one dimension of at least one geological feature of an earthen formation from a subterranean well bore, the at least one geological feature being at least partially located within a zone of interest in the earthen formation that is proximate to the well bore, the system comprising:
- a conductive fluid disposed in at least part of the well bore and at least one geological feature;
- at least two spaced-apart electric field generating electrodes configured to create a constant electric field extending at least partially into the zone of interest;
- at least one target object disposed within the zone of interest outside the well bore, having a different electrical contrast as compared to said conductive fluid and capable of creating perturbations in the electric field; and
- at least two spaced-apart sensing electrodes disposed within the well bore and configured to detect differences therebetween in electric potential measured in volts caused by said at least one target object and provide data relating thereto for use in approximating or determining at least one dimension of at least one geological feature, said sensing electrodes being configured to be movable relative to said at least one target object in order to detect electric potential differences at different times and locations.

23. The system of claim 22 wherein said at least two spaced-apart electric field generating electrodes includes at least one elongated positive electric field generating electrode disposed within the well bore and at least one negative electric field generating electrode not disposed within the well bore.

24. The system of claim 22 wherein said at least two electric field generating electrodes includes at least one positive electric field generating electrode disposed within the well bore and at least one negative electric field generating electrode disposed within or outside the well bore.

25. The system of claim 24 further including at least fifteen said electric field generating electrodes and at least ten said sensing electrodes.

26. The system of claim 24 further wherein said positive electric field generating electrodes are configured to synchronously inject current in parallel in the same direction to create the electric field over the full length of the at least one geological feature in the zone of interest, wherein the length of the at least one geological feature may be approximated or determined based at least partially upon data obtained by said sensing electrodes.

27. The system of claim 24 wherein said at least two spaced-apart electric field generating electrodes includes a plurality of pairs of positive electric field generating electrodes and negative electric field generating electrodes arranged in a single line and moveable into and within the well bore, further including a distinct said sensing electrode corresponding with each said pair of positive and negative electric field generating electrodes, wherein said electric field generating electrodes and said sensing electrodes are configured to be concurrently moveable within the well bore and relative to said at least one target object.

28. The system of claim 27 wherein the at least one geological feature is a hydraulic fracture and said at least one target object includes the wall of the hydraulic fracture during a first detection phase of said sensing electrodes and proppant placed into the hydraulic fracture during a second detection phase of said sensing electrodes.

29. The system of claim 27 wherein said electric field generating electrodes and said sensing electrodes are disposed upon a common carrier.

* * * * *